United States Patent
Suzuki et al.

(10) Patent No.: US 8,153,329 B2
(45) Date of Patent: Apr. 10, 2012

(54) PROTON CONDUCTING ELECTROLYTE MEMBRANE AND PRODUCTION METHOD THEREOF AND SOLID POLYMER FUEL CELL USING THE SAME

(75) Inventors: Takayuki Suzuki, Hachioji (JP); Takato Chiba, Hachioji (JP)

(73) Assignee: Konica Minolta Holdings, Inc. (JP)

( * ) Notice: Subject to any disclaimer, the term of this patent is extended or adjusted under 35 U.S.C. 154(b) by 1493 days.

(21) Appl. No.: 11/156,907

(22) Filed: Jun. 20, 2005

(65) Prior Publication Data

US 2007/0020499 A1   Jan. 25, 2007

(30) Foreign Application Priority Data

Jun. 24, 2004 (JP) ................................. 2004-186208

(51) Int. Cl.
*H01M 8/10* (2006.01)
(52) U.S. Cl. ........ 429/492; 429/313; 429/314; 429/479; 429/491; 429/493; 521/27; 521/28; 526/279; 526/286; 526/287; 526/346
(58) Field of Classification Search .................. None
See application file for complete search history.

(56) References Cited

U.S. PATENT DOCUMENTS

| | | | |
|---|---|---|---|
| 6,893,726 B2 * | 5/2005 | Nakashima et al. | 428/447 |
| 2006/0141313 A1 * | 6/2006 | Nomura et al. | 429/30 |
| 2006/0219981 A1 * | 10/2006 | Miyama et al. | 252/500 |
| 2006/0263660 A1 * | 11/2006 | Takaoka et al. | 429/33 |
| 2006/0293475 A1 * | 12/2006 | Ito et al. | 526/277 |
| 2008/0070086 A1 * | 3/2008 | Fukuchi et al. | 429/33 |
| 2008/0242750 A1 * | 10/2008 | Ravikiran et al. | 521/27 |
| 2009/0017358 A1 * | 1/2009 | Kawada | 429/33 |
| 2009/0297908 A1 * | 12/2009 | Kohl et al. | 429/31 |
| 2010/0040927 A1 * | 2/2010 | Yoshida et al. | 429/33 |

FOREIGN PATENT DOCUMENTS

| | | | |
|---|---|---|---|
| JP | 10-312815 | | 11/1998 |
| JP | 2000-277131 A | | 10/2000 |
| JP | 2001-283635 A | | 10/2001 |
| JP | 2002-083514 | | 3/2002 |
| JP | 2007-048655 A1 | * | 2/2007 |
| WO | 00/54351 A1 | | 9/2000 |
| WO | WO 00/54351 | | 9/2000 |
| WO | 01/60872 A1 | | 8/2001 |
| WO | WO 2004/097850 | * | 11/2004 |
| WO | WO 2005/034270 | * | 4/2005 |

OTHER PUBLICATIONS

"Proton Conductivity and Methanol Permeation in Nafion™ /Ormosil Prepared with Various Organic Silanes" authored by Kim et al. and published in the Journal of Membrane Science (2004), 238 (1-2), 213-222.*
machine translation of JP 2000-277131 A (Oct. 2000).*
Toshinori Mitsui et al., "Preparation of Organic-Inorganic Composite Electrolyte Membrane for Direct Methanol Fuel Cell"; Electrochemistry 70, No. 12 (2002); pp. 934-936.
Notice of Reasons for Refusal for Japanese Patent Application No. 2004-186208 mailed May 25, 2010 with English translation.

* cited by examiner

*Primary Examiner* — Marc Zimmer
(74) *Attorney, Agent, or Firm* — Cantor Colburn LLP

(57) ABSTRACT

A proton-conducting electrolyte membrane containing a porous inorganic substrate, a porous portion of the porous inorganic substrate being filled with a proton-conducting polymer, wherein the proton-conducting polymer is a co-polymer of: (i) a monomer compound having an ethylenically unsaturated bond and a sulphonic acid group in the molecule; and (ii) a silyl compound represented by Formula (1):

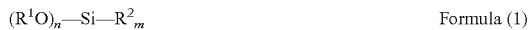

$(R^1O)_n$—Si—$R^2_m$   Formula (1)

wherein $R^1$ is an alkyl group of 1 to 4 carbon atoms; $R^2$ is an organic group capable of co-polymerizing; m and n each are an integer of 1 to 3, with the proviso that m plus n equals 4; and $R^2$ may be the same or different when m is 2 or 3.

14 Claims, 2 Drawing Sheets

PROTON CONDUCTING ELECTROLYTE MEMBRANE AND PRODUCTION METHOD THEREOF AND SOLID POLYMER FUEL CELL USING THE SAME

This application claims priority from Japanese Patent Application No. 2004-186208 filed on Jun. 24, 2004, which is incorporated hereinto by reference.

TECHNICAL FIELD

The present invention relates to proton-conducting electrolyte membranes and their production method, and further to solid polymer fuel cells which employ those proton-conducting electrolyte membranes as a fuel cell electrolyte membrane.

BACKGROUND

A fuel cell is a generator which generates electricity by allowing hydrogen to react with oxygen, and exhibits excellent properties in which only water is formed via generation reaction. Consequently, it has attracted an increasing interest as an energy saving technology which would help to overcome environmental problems such as global warming and ozone layer depletion.

Currently fuel cells are classified into four types; a solid polymer fuel cell, a phosphoric acid fuel cell, a fused carbonate fuel cell, and a solid oxide fuel cell. Of these, the solid polymer fuel cell exhibits advantages in which the operation temperature is relatively low and the electrolyte is a solid (being the polymer membrane). Solid polymer fuel cells are classified into two types: a modifying type in which methanol is converted to hydrogen employing a modifier and the other direct type (being a DMFC, Direct Methanol Polymer Fuel Cell), in which methanol is directly employed without using a modifying unit. DMFC is capable of being smaller and lighter due to the fact that s modifying unit is not required and is expected to be realized as a cell as well as an exclusive battery of PDA (Personal Digital Assistance).

The solid polymer fuel cell is composed mainly of electrode catalysts, electrolytes, and separators. Employed as electrolytes are proton-conducting membranes. Proton-conducting electrolyte membranes have been used for ion exchange membranes as well as humidity sensors, but in recent years, have attracted an increasing interest for the use in a solid polymer fuel cell. For example, sulfuric acid group containing fluororesin membranes represented by NAFION available from Du Pont have been studied as an electrolyte in easily portable fuel cells.

These conventionally known fluororesin based proton-conducting membranes exhibit disadvantages such as high methanol permeability. In order to apply solid polymer fuel cells, employing conducting membranes to new uses, it is essential to develop membranes which exhibit high proton conductivity as well as low methanol permeability. Further, in order to enhance performance, a decrease in the thickness of the membrane is essential, while still maintaining sufficient physical strength of the membranes.

Accordingly, various methods have been proposed in which porous substrates, incorporating voids, are impregnated with proton-conducting polymers to prepare proton-conducting membranes.

For the purpose of providing ion exchange membranes in which ionic conductivity and crossover of gases of reactants are not degraded, compared to conventional non-reinforced ion exchange membranes which are subjected to improvement in dimensional stability, are composed of the same polymer, and are of a comparative thickness, composite membranes are disclosed (refer, for example to Patent Document 1) in which ion-conducting polymers are buried into a porous support which is formed employing randomly oriented individual fibers.

Further, for the purpose of providing electrolyte membranes which retard penetration (cross-over) of methanol and are durable for the use at high temperature (of at least 100° C.), electrolyte membranes are disclosed (refer, for example, to Patent Document 2) in which pores of porous substrates, which do not swell in methanol as well as water, are filled with proton-conducting polymers. Employed as porous substrates are inorganic materials such as ceramics, glass, and alumina, as well as heat resistant polymers such as polytetrafluoroethylene or polyimide. It describes that the void ratio of the porous substrates is preferably 10-95 percent, the average void diameter is preferably 0.001-100 μm, and the thickness is preferably an order of several μm.

Further, to provide proton-conducting membranes which exhibit desired durability and mechanical strength, proton-conducting membranes are disclosed (refer, for example, to Patent Documents 3) which are constituted in such a manner that polymers having a phosphoric acid group, a sulfonic acid group, or a phosphinic acid group on the side chain are carried into the interior of voids. Listed as porous substrates are ultra-high molecular weight polyolefin resins as well as fluororesins. It describes that the void ratio of the porous substrates are preferably 30-85 percent, the average pore diameter is preferably 0.005-10 μm, and the thickness is preferably 5-500 μm.

Further, to minimize methanol penetration (being crossover) as much as possible, electrolyte membranes are disclosed (refer, for example, to Non-patent Document 1) in which uniformly arranged pores of inorganic porous substrates are filled with proton-conducting polymers.

(Patent Document 1) Japanese Patent Publication Open to Public Inspection (hereinafter referred to as JP-A) No. 10-312815

(Patent Document 2) International Patent Publication Open to Public Inspection No. 00/54351

(Patent Document 3) JP-A No. 2002-83514

(Non-patent Document 1) Electrochemistry, 70, 934 (2002)

SUMMARY

In order to strengthen proton-conducting electrolyte membranes for practical use as an electrolyte in solid polymer fuel cells, essential factors are sufficiently high proton conductivity as well as sufficiently low methanol permeability. In addition, it is desired that it is possible to industrially achieve mass production of proton-conducting electrolyte membranes of stable quality.

Accordingly, an object of the present invention is to provide a proton-conducting electrolyte membrane with sufficiently high proton conductivity and sufficiently low methanol permeability, and to provide a production method of the proton-conducting electrolyte membrane exhibiting such excellent performance.

Another object of the present invention is to provide a solid polymer fuel cell which incorporates a proton-conducting electrolyte membrane exhibiting the excellent performance, described above.

An aspect of the present invention is a proton-conducting electrolyte membrane containing a porous inorganic substrate, a porous portion of the porous inorganic substrate being filled with a proton-conducting polymer, wherein the proton-conducting polymer is a co-polymer of:
(i) a monomer compound having an ethylenically unsaturated bond and a sulphonic acid group in the molecule; and
(ii) a specific compound containing a silicon atom in the molecule.

DESCRIPTION OF THE PREFERRED EMBODIMENTS

Figure 1:
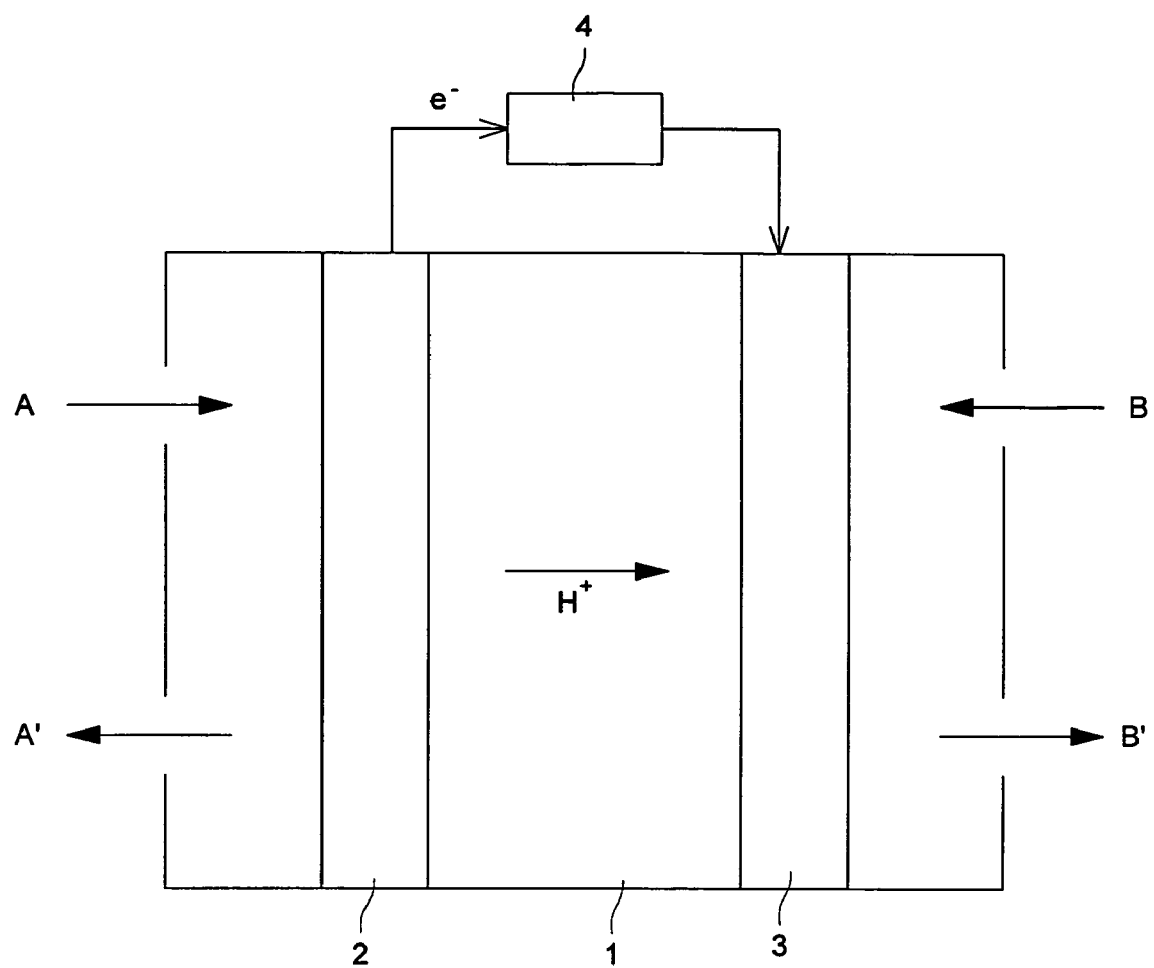
FIG. 1 is a schematic view showing one embodiment of-the direct methanol solid polymer fuel cell of the present invention.

The above objects of the present invention were achieved employing the embodiments described below.
(1) A proton-conducting electrolyte membrane comprising a porous inorganic substrate, a porous portion of the porous inorganic substrate being filled with a proton-conducting polymer, wherein the proton-conducting polymer is a co-polymer of:
(i) a monomer compound having an ethylenically unsaturated bond and a sulphonic acid group in the molecule; and
(ii) a silyl compound represented by Formula (1):

$(R^1O)_n$—Si—$R^2_m$         Formula (1)

wherein $R^1$ is an alkyl group of 1 to 4 carbon atoms; $R^2$ is an organic group capable of co-polymerizing; m and n each are an integer of 1 to 3, with the proviso that m plus n equals 4; and $R^2$ may be the same or different when m is 2 or 3.
(2) The proton-conducting electrolyte membrane of the above-described item 1,
wherein the porous inorganic substrate is produced by a method comprising the steps of:
preparing a dispersion containing inorganic particles, organic particles and a dispersant;
applying the dispersion on a support to obtain a layer; and
burning the applied layer.
(3) The proton-conducting electrolyte membrane of any one of the above-described items 1 and 2,
wherein the proton-conducting polymer has a cross-linking structure in the molecule.
(4) The proton-conducting electrolyte membrane of any one of the above-described items 1 to 3,
wherein $R^2$ in Formula (1) is selected from the group consisting of an epoxy group, a styryl group, a methacryloxy group, an acyloxy group and a vinyl group.
(5) The proton-conducting electrolyte membrane of any one of the above-described items 1 to 4,
wherein the monomer compound which forms the proton-conducting polymer is p-styrene sulphonic acid.
(6) The proton-conducting electrolyte membrane of any one of the above-described items 1 to 5,
wherein an average diameter of pores in the porous inorganic substrate is 10 to 450 nm.
(7) The proton-conducting electrolyte membrane of any one of the above-described items 1 to 6,
wherein a void ratio in the porous inorganic substrate is 40 to 95%.
(8) The proton-conducting electrolyte membrane of any one of the above-described items 2 to 7,
wherein inorganic particles which form the porous inorganic substrate have an average particle diameter of primary particles in the range of 10 to 100 nm.
(9) A solid polymer fuel cell comprising a cathode, an anode and an electrolyte between the cathode and the anode,
wherein the electrolyte is the proton-conducting electrolyte membrane of any one of the above-described items 1 to 8.
(10) A method of forming a proton-conducting electrolyte membrane comprising the steps of:
preparing a dispersion containing inorganic particles and organic particles;
applying the dispersion on a support to obtain a layer; and
burning the applied layer so as to obtain a porous inorganic substrate having a porous portion,
filling the porous portion of the porous inorganic substrate with:
(i) a monomer compound having an ethylenically unsaturated bond and a sulphonic acid group in the molecule; and
(ii) a silyl compound represented by Formula (1):

$(R^1O)_n$—Si—$R^2_m$         Formula (1)

wherein $R^1$ is an alkyl group of 1 to 4 carbon atoms; $R^2$ is an organic group capable of co-polymerizing; m and n each are an integer of 1 to 3, with the proviso that m plus n equals 4; and $R^2$ may be the same or different when m is 2 or 3; and
polymerizing the monomer compound of (i) and the silyl compound of (ii) filled in the porous portion of the porous inorganic substrate.
(11) The method of forming a proton-conducting electrolyte membrane of the above-described item 10,
wherein a volume ratio of the inorganic particles to the organic particle in the dispersion is between 5:95 and 60:40.
(12) The method of forming a proton-conducting electrolyte membrane of any one of the above-described items 10 and 11,
wherein the applying step of the dispersion is carried out using a coating method.

While the preferred embodiments of the present invention have been described using specific terms, such description is for illustrative purposes only, and it is to be understood that changes and variations may be made without departing from the spirit or scope of the appended claims.

According to the present invention, it is possible to provide proton-conducting electrolyte membranes with sufficiently high proton conductivity and sufficiently low methanol permeability and a production method thereof, as well as to provide polymer fuel cells employing the aforesaid proton-conducting electrolyte membranes.

The present invention will now be detailed.

The proton-conducting electrolyte membrane of the present invention is an electrolyte membrane which can be prepared via a process in which a dispersion incorporating inorganic and organic particles is coated, a process in which the dispersion coating is burned, and a process in which an porous inorganic substrate prepared via the burning process is filled with proton-conducting polymers.

In the above coating process, supports-may be employed. Supports composed of any appropriate materials may be employed as long as they are finally eliminated via burning or melting or may be removed via peeling. Supports as employed above may be composed of any appropriate materials such as paper e.g., filters, cloth e.g., unwoven fabric, or polymer films, e.g., polyethylene terephthalate film. It is preferable that the surface of the supports is smooth. Since the surface is smooth, the surface of the resulting proton-conducting electrolyte membrane also becomes smooth. When employed as the electrolytes of solid polymer fuel cells, the contact at the boundary between the electrode and the proton-conducting electrolyte membrane is more assured. The surface roughness of supports is not particularly limited. However, it is preferable that roughness Rz of the surface onto which a dispersion incorporating inorganic and organic particles is applied is at most 3 μm. Surface roughness Rz refers to 10-point mean surface roughness Rz specified in JIS. Its determination may be performed employing, for example, a needle contact system three-dimensional roughness meter (SURFCOM 570A), produced-by Tokyo Seimitsu Co., Ltd.). Further, in some cases, it is preferable that in order to minimize curling and deflection of supports due to coating of the dispersion incorporating inorganic and organic particles, a backing layer is provided on the surface opposite the surface onto which the dispersion is applied.

Listed as usable inorganic particles are silica ($SiO_2$), alumina ($Al_2O_3$), zirconium oxide ($ZrO_2$), boron oxide ($B_2O_3$), and titania ($TiO_2$), as well as hydroxides of Ti, Al, B, and Zr. These may be employed individually or in mixtures of several types. In the present invention, silica ($SiO_2$) is preferred. Further, of several types of silica ($SiO_2$), amorphous silica is preferred, and types which are prepared employing a dry process method, a wet process method, or an aero gel method may be acceptable. However, colloidal silica prepared by the wet process method is more preferred.

In the present invention, with regard to the diameter of inorganic particles, the average particle diameter is preferably at least 10 nm in terms of average diameter of the primary particles, is more preferably 10-100 nm, but is still more preferably 10-50 nm. Incidentally, it is possible to determine the average diameter of inorganic particles as follows. For example, the major diameter of 200 randomly selected particles is determined via observation employing a scanning type electron microscope, whereby the average particle diameter is determined.

It is possible to employ organic particles composed of any appropriate materials as long as they are finally eliminated upon being burned or melted. However, preferred are those which are not swelled by solvents, which are employed as dispersion media to prepare the dispersion. In the present invention, preferred as dispersion media are water based solvents. Employed as organic particles are, for example, polymer beads composed of acryl resins, styrene resins, styrene/acryl based resins, styrene/divinylbenzene based resins, polyester based resins, and urethane based resins. In the present invention, the average diameter of organic particles is preferably 10-450 nm, but is more preferably 100-300 nm.

Since porous inorganic substrates in the present invention are formed via a burning process after a dispersion incorporating inorganic and organic particles is coated, inorganic particles are allowed to adhere to each other and burned to form a thin membrane, and at the same time, portions which are mainly occupied by organic particles, form pores in the resulting thin membrane. In the present invention, the average pore diameter of the porous inorganic substrate is preferably 10-450 nm, but is more preferably 100-300 nm. It is possible to determine the the average pore diameter based on mercury intrusion porosimetry, employing, for example, PORE SIZER 9320, produced by Shimadzu Corp. It was discovered that proton-conducting electrolyte membranes, which were prepared by filling the porous inorganic substrate prepared as above with proton-conducting polymers, exhibit higher proton conductivity as well as lower methanol permeability.

In the present invention, the void ratio of the porous substrate is preferably 40-95 percent, but is more preferably 50-70 percent.

It is possible to calculate the void ratio based on the following formula:

$$\text{Void ratio (in percent)} = \{1-(10^4 \cdot W/(S \cdot t \cdot d))\} \times 100$$

wherein W (in g) represents the weight per unit area S (in $cm^2$), t (in μm) represents the average thickness, and d (in $g/cm^2$) represents density of the porous substrate.

By employing inorganic particles in an amount of 5-60 percent by volume and organic particles in an amount of 40-95 percent by volume (so that the sum of the volume of inorganic and organic particles is 1), it is possible to control the void ratio of the porous substrates within the above desired range.

Methods for preparing a dispersion incorporating inorganic and organic particles according to the present invention will now be described.

The used ratio of inorganic particles to organic particles is as described above. The concentration of the dispersion is controlled to be 5-80 percent by weight in terms of solid concentration, but is preferably 10-40 percent by weight.

Preferred as media are water-based media. Employed as water based media are various types, such as water and alcohols, but water or solvent mixtures incorporating water as a main component are preferably employed.

Employed as dispersing aids which disperse inorganic and organic particles may, for example, be various types of surface active agents such as higher fatty acid salts, alkyl sulfates, alkyl ester sulfates, alkyl sulfonates, sulfosuccinates, naphthalene sulfonates, alkyl phosphates, polyoxyalkylene alkyl ether phosphates, polyoxyalkylene alkyl phenyl ether, polyoxyethylene polyoxypropylene glycol, glycerin ester, sorbitan ester, polyoxyethylene fatty acid amides, or amine oxides.

Listed as dispersion devices are, for example, a ball mill, a sand mill, an attritor, a roller mill, an agitator, a Henschel mixer, a colloid mill, an ultrasonic homogenizer, a pearl mill, a wet type jet mill, and a paint shaker. These may be used individually or in appropriate combinations.

Processes to coat a dispersion incorporating inorganic and organic particles include a method in which a dispersion is filtered through a membrane filter, employing a vacuum suction filtration device and a layer incorporating inorganic and organic particles is allowed to accumulate on the membrane filter and subsequently dried followed by peeling away the membrane filter, or a method in which a dispersion is applied onto a support and subsequently dried. In the present invention, a system is preferred in which a dispersion is applied onto a support. Employed as coating systems may be conventionally known coating systems such as a roller coating method, a rod bar coating method, an air knife coating method, a spray coating method, a curtain coating method, and an extrusion coating method.

Porous inorganic substrates may be formed as follows. A dispersion incorporating inorganic and organic particles is coated and subsequently dried. Alternatively, when a support is eliminated upon being burned or melted, a coating on the above support may be burned in an ambience of nitrogen employing an electric furnace. Burning may be performed employing an electric furnace fitted with a heat generator such as molybdenum silicide, and is performed preferably at 1,100° C. or lower, but more preferably between 400-1,000° C. It is appropriate to set the heating time based on the targeted size of the porous substrate. Specifically, for example, it is possible to use heating duration of approximately 5 hours. When the heating duration is prolonged, the average pore diameter occasionally decreases due to the progress of burning. It is possible to appropriately set a temperature increase rate as well as a temperature decrease rare during the heating process to prepare porous substrates. It is preferable that both temperature increase rate and temperature decrease rate are controlled to be 100-300° C./hour.

Proton-conducting polymers, which are used to filled pores of the porous inorganic substrates according to the present invention, are characterized in that they are polymers prepared by copolymerizing compounds having at least one sulfonic acid group, as well as at least one ethylenic unsaturated bond, in the molecule with the compounds represented by described General Formula (1) as essential components. Further, copolymerization may be performed employing other unsaturated compounds which are copolymerizable with the above compounds.

The above compounds, having at least one sulfonic acid group as well as at least one ethylenic unsaturated bond in the molecule, are not particularly limited, and examples include allylsulfonic acid, methaallylsulfonic acid, vinylsulfonic acid, p-styrenesulfonic acid, (meth)acrylic acid butyl-4-sulfonic acid, (meth)acryloxybenezenesulfonic acid, t-butylacrylamidosulfonic acid, 2-acrylamido-2-methylpropanesulfonic acid, and isoprenesulfonic acid. Of these, preferred is p-styrenesulfonic acid. These compounds having at least one sulfonic acid group, as well as at least one ethylenic unsaturated bond, may be employed individually or in combinations of at least two types.

As other suitable copolymerizable unsaturated compounds, all the unsaturated compounds having at least one ethylenic unsaturated bond are included in this unsaturated compound. Of these, preferably employed are (meth)acrylonitrile, (meth)acrylic acid esters, and substituted or unsubstituted styrenes. Further preferred are ethylene glycol di(meth)acrylate, trimethylolpropane tri(meth)acrylate, hexamethylenediol di(meth)acrylate, all of which incorporate a plurality of ethylenic unsaturated bonds in the molecule, as well as divinylbenzene, and N,N-methylenebisacrylamide, since durability of electrolyte membranes is enhanced due to the formation of crosslinking structures.

$R^1$ of the compounds represented by aforesaid General formula (1) represents an alkyl group having at most 4 carbon atoms, examples of which include a methyl group, an ethyl group, a propyl group, and a butyl group. $R^2$ of the compounds represented by General Formula (1) represents a copolymerizable group which is preferably an organic group incorporating at least one of an epoxy group, a styryl group, a methacryloxy group, an acryloxy group, or a vinyl group.

Specific examples of the compounds represented by General Formula (1) include vinyltrimethoxysilane, vinyltriethoxysilane, 2-(3,4-epoxycyclohexyl)ethyltrimethoxysilane, 3-glycydoxypropyltrimethoxysilane, 3-glycydoxypropylmethyldiethoxysilane, 3-glycydoxypropyltriethoxysilane, p-styryltrimethoxysilane, 3-methacryloxypopylmethyldimethoxysilane, 3-methacryloxypropyltrimethoxysilane, 3-methacryloxypropylmethyldiethoxysilane, 3-methacryloxypropyltriethoxysilane, and 3-acryloxypropylmethoxysilane. The silyl group of the compounds represented by aforesaid General Formula (1) takes part in a reaction, whereby it is possible to form crosslinking structures. In addition, one of the preferred embodiments is that the silyl group of the compounds represented by General Formula (1) reacts with a silanol group on the inorganic porous surface to form a bond.

Methods to allow have proton-conducting polymers to fill the pores of the porous inorganic substrate are not particularly limited. For example, it is possible to allow the proton-conducting polymers to fill the pores of the porous substrate, employing a method in which the above proton-conducting polymer solution is applied onto the porous substrate, or a method in which the porous substrate is immersed into the above proton-conducting polymer solution. During such operations, it is possible to allow the proton-conducting polymers to easily fill the pores of the porous substrates under use of ultrasonic waves or reduced pressure.

A method is preferred in which a solution containing proton-conducting polymer precursors (such as compounds having at least one sulfonic acid group as well as at least one ethylenic unsaturated bond in the molecule or the compounds represented by above General formula (1)), as well as polymerization initiators, is allowed to fill pores of a porous substrate and are subjected to in-situ polymerization, employing conventionally known methods such as heat polymerization or photopolymerization, whereby proton-conducting polymers are prepared. During such operations, it is possible to easily have the above solution containing proton-conducting polymer precursors, as well as polymerization initiators, to fill the pores employing ultrasonic waves or reduced pressure. A method is also preferred in which after performing a treatment to allow the surface of pores to be hydrophilic, the above solution containing proton-conducting polymer precursors as well as polymerization initiators, are allowed to fill filled pores of a porous substrate and is subjected to in-situ polymerization. Further, it is preferable that the viscosity of the above solution containing proton-conducting polymer precursors, as well as polymerization initiators, is suitably controlled to easily fill the pores. Namely, in order to increase the viscosity, some of the monomers may be subjected to preliminary polymerization, or a small amount of appropriate polymers may be added, and dissolved. On the contrary, in order to decrease the viscosity, dilution may be performed by the addition of suitable solvents.

Suitably employed as the above polymerization initiators may be those which are conventionally known. Of these, preferred are heat polymerization initiators as well as photopolymerization initiators. Heat polymerization initiators, as described herein, refer to compounds capable of generating polymerizable radicals upon being heated. Listed as such compounds may, for example, be azobisnitrile based compounds such as 2,2'-azobisisobutyronitrile or 2,2'-azobispropionitrile; peroxides such as benzoyl peroxide, lauroyl peroxide, acetyl peroxide, t-butyl perbenzoate, α-cumylhydroperoxide, di-t-butyl peroxide, diisopropylperoxydicarbonate, t-butylperoxyisopropyl carbonate; organic peroxides such as alkylperoxycarbamates or nitrosoarylacylamines; inorganic peroxides such as potassium persulfate, ammonium persulfate, or potassium perchlorate; azo or diazo based compounds such as diaminobenzene, p-nitrobenzenediazonium, azobis-substitured alkanes, diazothioethers, and arylazosulfones; nitrosophenylurea, tetramethylthiuram disulfide, diaryl disulfides, dibenzoyl disulfide, tetraalkylthiuram disulfides, dialkylxanthogen disulfies, arylsulfinic acids, arylalkylsulfones, and 1-alkansulfinic acids.

Of these, particularly preferred are compounds which exhibit excellent stability at normal temperature as well as a high decomposition rate when heated. The amount of initiators is preferably in the range of 0.1-30 percent by weight with respect to the total polymerizable compositions, but is more preferably in the range of 0.5-20 percent by weight.

Listed as photopolymerization initiators may be neighboring polyketone compounds (e.g., diacetyl and dibenzyl) represented by R—$(CO)_x$—R' (wherein R and R' each represent hydrogen or a hydrocarbon group while x represents an integer of 2 or 3); carbonylalcohols (e.g., benzoin) represented by R—CO—CHOH—R' (wherein R and R' each represent hydrogen or a hydrocarbon group); acyloin-ethers (e.g., benzoin methyl ether) represented by R—CH(OR")—CO—R' (wherein R, R', and R" each represent a hydrocarbon group); substituted acyloins (e.g., α-alkylbenzoin) represented by Ar—CR(OH)—CO—Ar (wherein Ar represents an aryl group while R represents a hydrocarbon group); and polynuclear quinones (e.g.,. 9,10-antharaquinone). These photopolymerization initiators may be employed individually or in combination.

The used amount of photopolymerization initiators is commonly in the range of 0.5-5 percent by weight with respect to the total weight of the unsaturated compounds, but is preferably in the range of 1-3 percent by weight.

The weight ratio of the aforesaid compounds having at least one sulfonic acid group, as well as at least one ethylenic unsaturated bond in the molecule, to the compounds represented by General Formula (1) is preferably in the range of 100:0.1-1:1. In cases in which other copolymerizable unsaturated compounds are incorporated, the weight ratio of the aforesaid compounds having at least one sulfonic acid group, as well as at least one ethylenic unsaturated bond in the molecule to the other copolymerizable unsaturated compounds, is preferably in the range of 100:0.1-1:1.

Incidentally, the ion exchange capacity of the aforesaid proton-conducting polymers is commonly 0.5-5.0 milliequivalent/g of the dried resins, but is preferably 1.0-4.5 milliequivalent/g of the dried resins. When the ion exchange capacity is at most 0.5 milliequivalent/g of the dried resins, ion-conducting resistance increases, while when it is at least 4.5 milliequivalent/g of the dried resins, water solubility increases.

It is possible to determine the above ion exchange capacity employing the following method. The above-mentioned proton-conducting polymers are immersed into a 2 mol/L aqueous sodium chloride solution for approximately 5 minutes so that the proton of the acidic group is replaced with sodium. Proton liberated into the solution via the above replacement is subjected to neutralization titration, employing a sodium hydroxide solution the concentration of which is previously known. Subsequently, proton amount (H$^+$) is calculated based on dry weight (W) of the above proton-conducting polymers and amount (V) of sodium hydroxide required for the neutralization titration, and the ion exchange capacity (in milliequivalent/g) is obtained based on the following formula. Incidentally, the following formula is applied to such a case in which the neutralization titration is performed employing a 0.05 mol/L aqueous NaOH solution.

Ion exchange capacity (in milliequivalent/g)=H$^+$/W= $(0.05V \times 10^{-3}/W) \times 10^3$ The thickness of the proton-conducting electrolyte membrane according to the present invention is not particularly limited, but is commonly at most 500 μm, is preferably at most 300 μm, but is more preferably 50-200 μm. It is possible to determine the above thickness employing a 1/10,000 thickness gauge. It is possible to obtain the average thickness in such a manner that the thickness of 5 randomly selected positions is determined, and the resulting values are averaged.

It is possible to employ the proton-conducting electrolyte membranes of the present invention in fuel cells. Of fuel cells, preferred is a methanol type fuel cell, while particularly preferred is a direct methanol type solid polymer fuel cell.

The direct methanol type solid polymer cell will now be described with reference to FIG. 1, which is a schematic view showing one embodiment of a direct methanol type solid polymer cell which employs the proton-conducting electrolyte membrane of the present invention as an electrolyte membrane.

In FIG. 1, numeral 1 is an electrolyte membrane, numeral 2 is an anode (being a fuel pole), numeral 3 is a cathode (being an air pole), and numeral 4 is an external circuit. Employed as a fuel is aqueous methanol solution A.

At anode 2, methanol reacts with water to generate carbon dioxide as well as a hydrogen ion (H$^+$), whereby an electron (e$^-$) is released. The hydrogen ion (H$^+$) passes through electrolyte 1 and is drawn to cathode 3, and an electron (e$^-$) is drawn to external circuit 4. On the other hand, aqueous solution A', in which a methanol component containing carbon dioxide has decreased, is discharged to the exterior of the system. The reaction at anode 2 is expressed by the following formula:

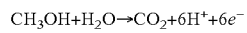
$$CH_3OH+H_2O \rightarrow CO_2+6H^++6e^-$$

At cathode 3, oxygen in air B, hydrogen ions (H$^+$) which have passed through electrolyte membrane 1, and electrons (e$^-$) fed from external circuit 4 undergo reaction to form water. On the other hand, air B' which incorporates water and has been subjected to a decrease in oxygen is discharged to the exterior of the system. The reaction at cathode 3 is expressed by the following formula:

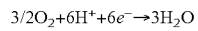
$$3/2O_2+6H^++6e^- \rightarrow 3H_2O$$

The overall reaction of the fuel cell is expressed by the following formula:

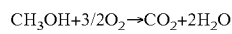
$$CH_3OH+3/2O_2 \rightarrow CO_2+2H_2O$$

It is possible to prepare anode 2 based on conventionally known structures. For example, in order from the electrolyte 1 side, structured are a catalyst layer and a support which maintains the catalyst layer. Further, it is also possible to prepare cathode 3 according to conventionally know structures. For example, in order from the electrolyte 1 side, structured are a catalyst layer and a support which maintains the catalyst layer.

Employed as catalysts of anode 2 and cathode 3 may be those known in the art, and noble metal catalysts such as platinum, palladium, ruthenium, iridium, or gold, as well as alloys such as platinum-ruthenium or iron-nickel-cobalt-molybdenum-platinum are employed.

To enhance conductivity, it is preferable that the catalyst layer incorporates electron conductors (being conducive materials). Electron conductors (being conductive materials) are not particularly limited. However, in view of electron conductivity as well as corrosion resistance, inorganic conductive materials are preferably employed. Of these, listed as preferred materials are carbon black and carbon materials such as graphite, or carbonaceous ones, as well as metals and semimetals. Herein preferably employed as carbon materials are carbon blacks such as channel black, thermal black, furnace black, or acetylene black based on electron conductivity, as well as increased specific surface area. Particularly preferably employed are catalyst-carrying electron conductors (being conductive materials) such as platinum-carrying carbon.

Production methods of membrane electrode assembly (MEA) via connection of a solid polymer electrolyte membrane and an electrode include a method in which, for example, platinum catalyst powders, in which carbon particles are employed as a carrier, are blended with a polytetrafluoroethylene suspension, and the resulting blend is applied onto a sheet of carbon paper, and after forming a catalyst layer via a thermal treatment, an electrolyte solution, which is the same as an electrolyte membrane, is applied onto the catalyst layer, and subsequently is subjected to hot pressing onto the electrolyte membrane to achieve integration. Other than this method, included are a method in which an electrolyte solution, which is the same as an electrolyte membrane, is previously applied onto platinum catalyst powders, a method in which a catalyst paste is applied onto an electrolyte membrane, a method in which an electrode is formed on-an electrolyte membrane employing electroless plating, and a method in which platinum group metal complex ions are adsorbed onto an electrolyte membrane, and subsequently reduced.

A single cell is prepared by being provided with a fuel distributing plate (being a separator) and an oxidizing agent distributing plate (being also a separator) as a current collector in which grooves are formed to form fuel passages and oxidizing agent passages on the outside of the electrolyte membrane electrode assembly prepared as above. A fuel cell is structured by laminating a plurality of the above single cells via cooling plates.

EXAMPLES

The present invention will now be detailed with reference to examples, however, the present invention is not limited thereto.

Example 1

<Preparation of Porous Substrate>
<Preparation of Porous Substrate No. 1>

A mixture (70 percent by volume of minute polystyrene particles and 30 percent by volume of colloidal silica) of minute polystyrene particles (5008B of an average particle diameter of 80 nm, produced by Moritex Corp.) and colloidal silica (SNOWTEX 50 of an average primary particle diameter of 20 nm, produced by Nissan Chemical Industries, Ltd.) was stirred and dispersed into an aqueous surface active agent solution at a low concentration, employing a high speed homogenizer. The concentration of the resulting dispersion was controlled to be 20 percent by weight.

The resulting dispersion was applied onto a polyethylene terephthalate support and subsequently dried to result in a membrane thickness of 150 μm after drying. Thereafter, the polyethylene terephthalate support was peeled away and the coating was burned in a 900° C. kiln for 3 hours, whereby Porous Substrate No. 1 was prepared.
<Preparation of Porous Substrate Nos. 2-4>

Porous Substrate Nos. 2-4 were prepared in the same manner as Porous Substrate No. 1, except that minute polystyrene particles and the colloidal silica were replaced as listed in Table 1.

Incidentally, 5022B and 5043B, both produced by Moritex Corp., were employed, having an average particle diameter of 220 and 430 nm, respectively. Further, SNOWTEX YL and SNOWTEX MP, both produced by Nissan Chemical Industries, Ltd. were employed, having an average primary particle diameter of 50 and 100 nm, respectively.

The pore diameter and the void ratio of each of Porous Substrate Nos. 1-4 are listed in Table 1. The void ratio was calculated based on the following formula:

$$\text{Void ratio (in percent)} = \{1 - [10^4 \cdot W/(S \cdot t \cdot d)]\} \times 100$$

wherein W is weight (in g) per unit area S (in $cm^2$), t is average thickness (in μm), and d is density (in $g/cm^3$).

The average pore diameter was determined employing, for example, PORE SIZER 9320, produced by Shimadzu Corp., based on mercury intrusion porosimetry.

TABLE 1

| Porous Substrate No. | Minute Polystyrene Particles Average Particle Diameter (nm) | Volume Percent | Colloidal Silica Average Primary Particle Diameter (nm) | Volume Percent | Pore Diameter (nm) | Void Ratio (%) |
|---|---|---|---|---|---|---|
| 1 | 80 | 80 | 20 | 20 | 70 | 70 |
| 2 | 220 | 50 | 20 | 50 | 200 | 45 |
| 3 | 220 | 60 | 50 | 40 | 210 | 60 |
| 4 | 430 | 50 | 100 | 50 | 405 | 50 |

(Production of Proton-Conducting Electrolyte Membranes)
(Production of Proton-Conducting Electrolyte Membrane No. 1)

Porous Substrate No. 1, prepared as above, was filled with proton-conducting polymers employing the method described below, and a proton-conducting electrolyte membrane (Electrolyte Membrane No. 1) was produced.

Blended into a mixture of isopropyl alcohol:water=4:1 were 2-acrylamido-2-methylpropanesulfonic acid, vinyltrimethoxysilane, N,N-methylenebisacrylamide as a crosslinking agent, and AIBN (2,2'-azobiosisobutyronitrile) as a polymerization initiator, to result in a weight ratio of 100:15:5:1, and the porous layer was immersed into the resulting mixture under reduced pressure. The porous substrate treated as above was interposed between two polyethylene terephthalate films and heated at 60° C. for two hours, and subsequently heated at 80° C. for an additional two hours, whereby a proton-conducting electrolyte membrane was prepared. The average thickness of the resulting proton-conducting electrolyte membrane was 150 μm. The average thickness was determined in such a manner that the thickness at each of 5 randomly selected positions was determined employing a thickness gauge and the resulting values were averaged.

(Production of Proton-conducting Electrolyte Membrane Nos. 2-12)

Proton-conducting Electrolyte Membrane Nos. 2-12 were prepared in the same manner as Proton-Conducting Electrolyte Membrane No. 1, except that the compound having at least one sulfonic acid group as well as at least one compound having an ethylenic unsaturated bond, the compound represented by General Formula (1), and other copolymerizable unsaturated compound are changed as listed in Table 2. Further, as comparison, NAFION 117 (produced by Du Pont) was employed.

TABLE 2

| Electrolyte Membrane No. | Porous Substrate No. | Compound Having a Sulfonic Acid Group and at Least One Ethylenic Unsaturated Bond Type | *1 | Compound Represented by General Formula (1) Type | *1 | Other Unsaturated Compound Type | *1 | Remarks |
|---|---|---|---|---|---|---|---|---|
| 1 | 1 | 2-acrylamido-2-methylpropanesulfonic acid | 100 | vinyltrimethoxysilane | 15 | N,N-methylenebis acrylamide | 5 | Inv. |
| 2 | 1 | 2-acrylamido-2-methylpropanesulfonic acid | 100 | 3-glycidoxypropyl trimethoxysilane | 20 | — | — | Inv. |
| 3 | 1 | p-styrenesulfonic acid | 100 | 3-methacryloxypropyl trimethoxysilane | 20 | N,N-methylenebis acrylamide | 10 | Inv. |
| 4 | 1 | 2-acrylamido-2-methylpropanesulfonic acid p-styrenesulfonic acid, two types which were employed in combination | 100 20 | 3-acryloxypropyl trimethoxysilane | 20 | — | — | Inv. |
| 5 | 2 | p-styrenesulfonic acid | 100 | vinyltrimethoxysilane | 5 | N,N-methylenebis acrylamide | 5 | Inv. |
| 6 | 2 | vinylsulfonic acid | 100 | 3-glycidoxypropyl methyldiethoxysilane | 30 | — | — | Inv. |
| 7 | 3 | 2-acrylamido-2-methylpropanesulfonic acid | 100 | p-styryltrimethoxysilane | 60 | N,N-methylenebis acrylamide | 10 | Inv. |
| 8 | 3 | p-styrenesulfonic acid | 100 | 3-glycidoxypropyl tromethoxysilane | 30 | — | — | Inv. |
| 9 | 4 | 2-acrylamido-2-methylpropanesulfonic acid p-styrenesulfonic acid, two types which were employed in combination | 100 50 | vinyltrimethoxysilane | 5 | N,N-methylenebis acrylamide | 5 | Inv. |
| 10 | 4 | vinylsulfonic acid | 100 | p-styryltrimethoxysilane | 30 | — | — | Inv. |
| 11 | 1 | 2-acrylamido-2-methylpropanesulfonic acid | 100 | — | — | N,N-methylenebis acrylamide | 10 | Comp. |
| 12 | 1 | p-styrenesulfonic acid | 100 | — | — | — | — | Comp. |

*1: Weight Ratio
Inv.: Present Invention
Comp.: Comparative Example (Evaluation of Proton-conducting Electrolyte Membranes)
(Proton Conductivity)

A proton-conducting electrolyte membrane was allowed to swell in water (at 25° C.), and was subsequently interposed between two platinum electrode plates. Its impedance was then determined employing an LCR METER HP4284A produced by Hewlett-Packard Co., followed by the calculation of proton conductivity.

(Permeability of Methanol)

Figure 2:
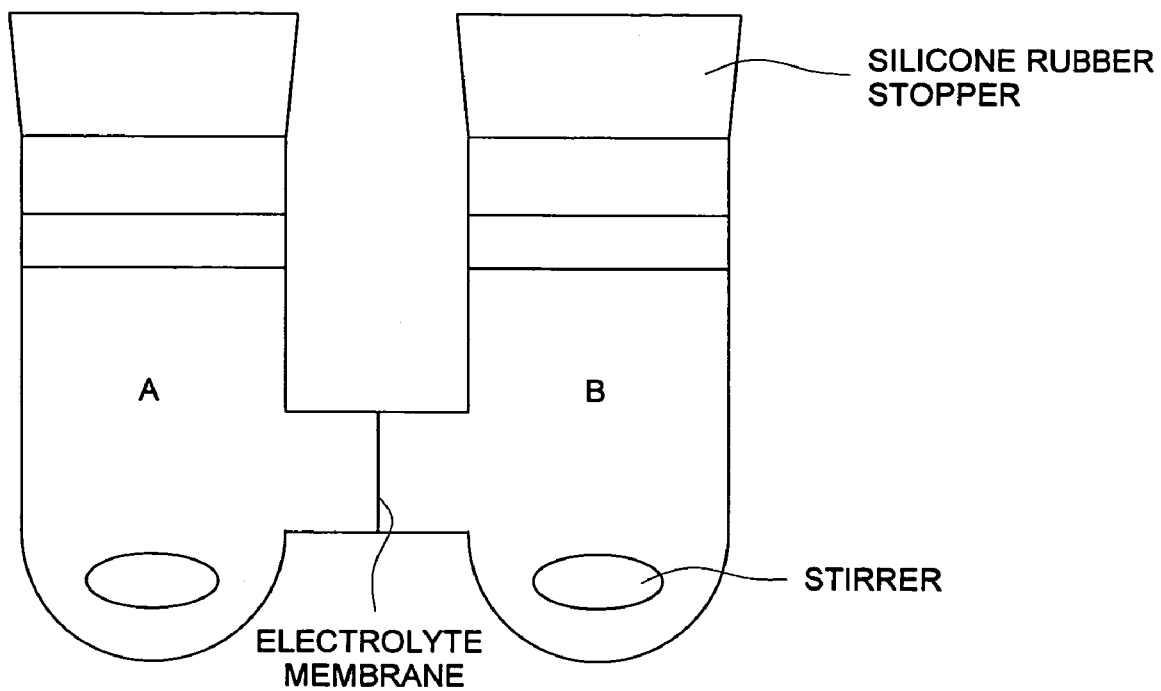
FIG. 2 is a schematic view of an H type cell to evaluate methanol permeability.

A proton-conducting electrolyte membrane was interposed between the H type cells (see FIG. 2), and the amount of methanol, which was permeated to pure water of B cell from a 2 mol/L aqueous methanol solution placed in A cell, was determined employing gas chromatography (GC-14B), produced by Shimadzu Corp. Table 3 show the results.

TABLE 3

| Electrolyte Membrane No. | Proton Conductivity S/cm | Permeation Amount of Methanol μmol/(min · cm²) | Remarks |
|---|---|---|---|
| 1 | $5.8 \times 10^{-2}$ | 0.75 | Inv. |
| 2 | $6.0 \times 10^{-2}$ | 0.79 | Inv. |
| 3 | $5.6 \times 10^{-2}$ | 0.72 | Inv. |
| 4 | $6.3 \times 10^{-2}$ | 0.78 | Inv. |
| 5 | $4.1 \times 10^{-2}$ | 0.91 | Inv. |
| 6 | $4.5 \times 10^{-2}$ | 0.93 | Inv. |
| 7 | $3.1 \times 10^{-2}$ | 0.60 | Inv. |
| 8 | $3.2 \times 10^{-2}$ | 0.61 | Inv. |
| 9 | $5.7 \times 10^{-2}$ | 0.83 | Inv. |
| 10 | $5.2 \times 10^{-2}$ | 0.87 | Inv. |
| 11 | $5.1 \times 10^{-2}$ | 5.23 | Comp. |
| 12 | $4.5 \times 10^{-2}$ | 4.38 | Comp. |
| NAFION 117 | $7.6 \times 10^{-2}$ | 9.50 | Comp. |

Inv.: Present Invention
Comp.: Comparative Example

Based on the results of Table 3, it can be seen that proton conducting electrolyte membranes (Electrolyte Membrane Nos. 1-10) of the present invention exhibit high proton conductivity and low methanol permeability. On the other hand, it can be seen that comparative proton-conducting electrolyte membranes (Electrolyte Membrane Nos. 11 and 12) exhibit high proton conductivity similar to NAFION 117, but exhibit disadvantage such as high methanol permeability.

(Preparation and Evaluation of Fuel Cells)

Membrane electrode assemblies were prepared employing proton-conducting electrolyte membranes (Electrolyte Membrane Nos. 1-12) prepared as above, as well as NAFION 117 as a comparative sample according to the following method, and evaluated.

<Preparation of Electrodes>

A carbon-fiber fabric substrate, which had been subjected to water-repellent treatment employing polytetrafluoroethylene (PTFE), was coated with a carbon black dispersion containing PTFE in an amount of 20 percent by weight and subsequently burned, whereby an electrode substrate was prepared. An anode electrode was prepared by applying an anode electrode catalyst liquid coating composition, composed of Pt—Ru carrying carbon and a NAFION (produced by Du Pont) solution, onto the resulting electrode substrate and then drying the resulting coating. On the other hand, a cathode electrode was prepared by applying a cathode electrode catalyst liquid coating composition, composed of Pt carrying carbon and a NAFION (produced by Du Pont) solution, onto the same and then drying the resulting coating.

<Preparation of Membrane Electrode Assemblies (MEA)>

Each of the membrane electrode assemblies (MEA) (MEA Nos. 1-12) and NAFION 117 was interposed between an anode electrode and a cathode electrode and pressed while heated, whereby each membrane electrode assemblies (MEA) (MEA Nos. 1-12) and MEA NAFION 117 was prepared. Each of the resulting membrane electrode assemblies (MEA) was interposed between separators, and the resulting fuel cell was operated while passing a 3 percent aqueous methanol solution on the anode side and passing air on the cathode side, whereupon current and voltage characteristics were evaluated. Table 4 shows the current density at a voltage of 0.4 V.

TABLE 4

| MEA No. | Current Density (A/cm$^2$) | Remarks |
| --- | --- | --- |
| 1 | 0.28 | Inv. |
| 2 | 0.24 | Inv. |
| 3 | 0.29 | Inv. |
| 4 | 0.31 | Inv. |
| 5 | 0.22 | Inv. |
| 6 | 0.21 | Inv. |
| 7 | 0.22 | Inv. |
| 8 | 0.23 | Inv. |
| 9 | 0.24 | Inv. |
| 10 | 0.23 | Inv. |
| 11 | 0.15 | Comp. |
| 12 | 0.12 | Comp. |
| NAFION 117 | 0.09 | Comp. |

Inv.: Present Invention
Comp.: Comparative Example

As seen form the results of Table 4, each of membrane electrodes assemblies (MEA) (MEA Nos. 1-10) exhibits greater current density than each of comparative membrane electrode assemblies (MEA) (MEA Nos. 11 and 12) and MEA NAFION 117.

What is claimed is:

1. A proton-conducting electrolyte membrane comprising a porous inorganic substrate, a porous portion of the porous inorganic substrate being filled with a proton-conducting polymer, wherein the proton-conducting polymer is a co-polymer derived from:
   (i) p-styrene sulphonic acid; and
   (ii) a silyl compound represented by Formula (1):
   $(R^1O)_n$--Si--$R^2_m$ Formula (1),
   wherein $R^1$ is an alkyl group of 1 to 4 carbon atoms; $R^2$ is selected from the group consisting of an a methacryloxy group, and an acryloxy group, m and n each are an integer of 1 to 3 with the proviso that m plus n equals 4, and $R^2$ may be the same or different when m is 2 or 3.

2. The proton-conducting electrolyte membrane of claim 1 wherein the compound represented by Formula (1) is selected from the group consisting of 3-methacryloxypropyltrimethoxysilane and 3-acryloxypropyltrimethoxysilane.

3. The proton-conducting electrolyte membrane of claim 1, wherein an average diameter of pores in the porous inorganic substrate is 10 to 450 nm.

4. The proton-conducting electrolyte membrane of claim 1, wherein a void ratio in the porous inorganic substrate is 40 to 95%.

5. A solid polymer fuel cell comprising a cathode, an anode, an electrolyte between the anode and the cathode, wherein the electrolyte is the proton-conducting electrolyte membrane of claim 1.

6. A proton-conducting electrolyte membrane comprising a porous inorganic substrate, a porous portion of the porous inorganic substrate being filled with a proton-conducting polymer, wherein an average diameter of pores in the porous inorganic substrate is 10 to 450 nm, wherein the proton-conducting polymer is a co-polymer derived from:
   (i) a monomer compound having an ethylenically unsaturated bond and a sulphonic acid group in the molecule; and
   (ii) a silyl compound represented by Formula (1):
   $(R^1O)_n$--Si--$R^2_m$ Formula (1),
   wherein $R^1$ is an alkyl group of 1 to 4 carbon atoms $R^2$ is selected from the group consisting of an a methacryloxy group, and an acryloxy group, m and n each are an integer of 1 to 3 with the proviso that m plus n equals 4, and $R^2$ may be the same or different when m is 2 or 3.

7. The proton-conducting electrolyte membrane of claim 6 wherein the compound represented by Formula (1) is selected from the group consisting of 3-methacryloxypropyltrimethoxysilane and 3-acryloxypropyltrimethoxysilane.

8. The proton-conducting electrolyte membrane of claim 6, wherein the co-polymer comprises one or more kind of the monomer compound which comprise 2-acrylamido-2-methylpropanesulfonic acid, p-styrene sulfonic acid, and vinylsulfonic acid or a mixture thereof.

9. The proton-conducting electrolyte membrane of claim 7, wherein the co-polymer comprises one or more kind of the monomer compound which comprise 2-acrylamido-2-methylpropanesulfonic acid, p-styrene sulfonic acid, and vinylsulfonic acid.

10. The proton-conducting electrolyte membrane of claim 6, wherein a void ratio in the porous inorganic substrate is 40 to 95%.

11. The proton-conducting electrolyte membrane of claim 6 wherein the monomer compound which forms the proton-conducting polymer is p-styrene sulfonic acid.

12. A solid polymer fuel cell comprising a cathode, an anode, an electrolyte between the anode and the cathode, wherein the electrolyte is the proton-conducting electrolyte membrane of claim 6.

13. A solid polymer fuel cell comprising a cathode, an anode, an electrolyte between the anode and the cathode, wherein the electrolyte is the proton-conducting electrolyte membrane of claim 9.

14. A solid polymer fuel cell comprising a cathode, an anode, an electrolyte between the anode and the cathode, wherein the electrolyte is a proton-conducting electrolyte membrane according to claim 9 wherein particles of the inorganic substrate have an average particle diameter of primary particles in the range of 10 to 100 nm.

* * * * *